United States Patent [19]
Shimizu et al.

[11] Patent Number: 4,573,373
[45] Date of Patent: Mar. 4, 1986

[54] LUBRICATION SYSTEM FOR AUXILIARY EQUIPMENT TRANSMISSION

[75] Inventors: Yasuo Shimizu; Masami Ogura, both of Tochigi, Japan

[73] Assignee: Honda Giken Kogyo Kabushiki Kaisha, Tokyo, Japan

[21] Appl. No.: 585,007

[22] Filed: Mar. 1, 1984

[30] Foreign Application Priority Data

Mar. 1, 1983 [JP] Japan .................................. 58-33554
Mar. 4, 1983 [JP] Japan .................................. 58-35556

[51] Int. Cl.$^4$ ..................... F16H 57/04; F16H 57/02; F01M 9/00
[52] U.S. Cl. ........................................ 74/468; 74/467; 74/606 R; 184/6.12
[58] Field of Search ..................... 74/468, 467, 606 R; 184/6.12

[56] References Cited

U.S. PATENT DOCUMENTS

| 1,554,081 | 9/1925 | Garrett | 74/467 |
| 3,467,221 | 9/1969 | Janke | 184/6.12 |
| 3,495,471 | 2/1970 | Johnson | 74/467 |
| 3,650,353 | 3/1972 | Abbott | 74/801 |

FOREIGN PATENT DOCUMENTS

| 204849 | 7/1958 | Austria | 74/468 |
| 567679 | 10/1975 | Switzerland | 74/468 |
| 19780 | of 1911 | United Kingdom | 74/467 |
| 952414 | 3/1964 | United Kingdom | 74/467 |
| 1407333 | 9/1975 | United Kingdom | 74/467 |

Primary Examiner—Leslie A. Braun
Assistant Examiner—Michael D. Bednarek
Attorney, Agent, or Firm—Lyon & Lyon

[57] ABSTRACT

A lubrication system with a lubricant feeding device disposed in the housing of a speed change mechanism for auxiliary devices. The lubricant flows from a central lubricant reservoir within the speed change mechanism through the moving surfaces to the inner surface of the housing due to centrifugal force. Excess lubricant is returned to the lubricant reservoir by the lubricant return device. If a planetary gear mechanism is used, the lubricant return force is provided by the meshing action of the pinion gears with the primary power transmission gear and an outer ring gear. The lubricant flow is directed by lubricant guide walls which substantially enclose said meshing portions and direct the lubricant to lubricant return passages. Examples of lubricant return passages include radially formed passages through the root of the primary power transmission gear and having communication with said internal lubricant reservoir or a recessed face on the primary power transmission gear and having communication with the internal lubricant reservoir. Fins may be formed about the speed change mechanism housing to provide increased cooling of the lubricant collected on the internal surface thereof.

6 Claims, 9 Drawing Figures

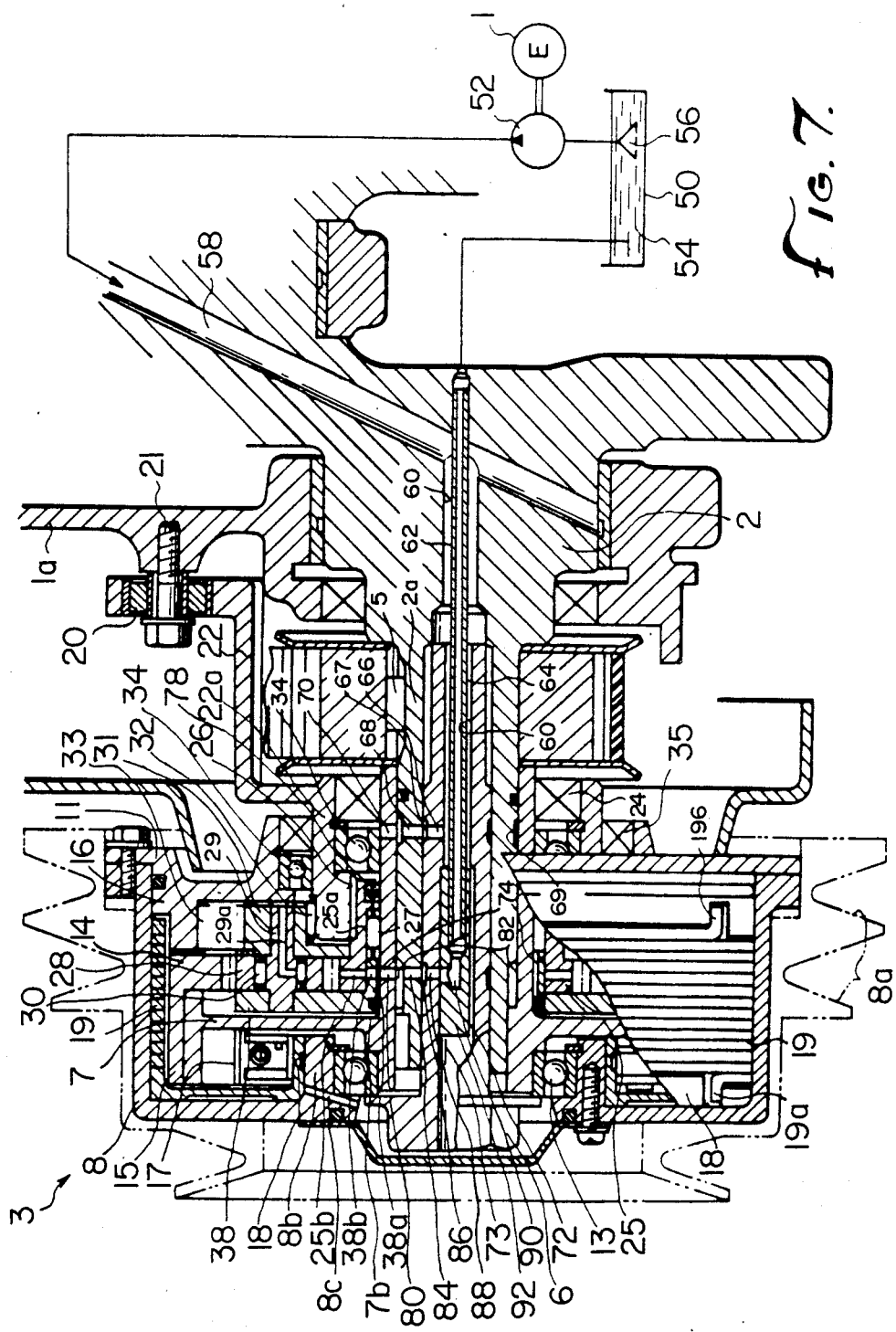

LUBRICATION SYSTEM FOR AUXILIARY EQUIPMENT TRANSMISSION

The field of the invention is lubricating systems for speed change mechanisms and more particularly means of circulating and recirculating lubricant within said speed change mechanisms.

Speed change mechanisms are used whenever it is desired to modify the speed of an output member relative to the input member. For example, a planetary gear transmission is often used as a spped change mechanism such as the speed change mechanisms disclosed in the commonly assigned pending U.S. patent application Shimuzu et al. Ser. No. 510,939, filed July 5, 1983 and Oqura, Ser. No. 483,369, filed Apr. 8, 1983. The input and output members in these transmissions are accommodated in a rotary housing which is connected to the output side and have an internal lubricant reservoir. In such speed change mechanisms, the lubricant flows from the internal lubricant reservoir to the inner surface of the rotary housing due to the centrifugal force of the transmission mechanism. Passages formed about the transmission components allow the lubricant to lubricate the rolling and sliding portions of the transmission, such as gears, clutches, bearings and seals whose efficacy is likely to be adversely effected in the absence of such lubrication due to heat and friction generated by the transmission.

The present invention is directed to a lubrication system for a multi-speed transmission mechanism which is used with a variable speed engine. The invention comtemplates a speed change mechanism with lubrication passages therethrough which enable the lubricant to flow from the center of rotation to the inside edge of the outer housing. Lubricant guide walls positioned about the primary power transmission gear and the accompanying pinion gears direct the lubricant flow to the lubricant return passages. Lubricant return passages may be formed radially through the root of the primary power transmission gear to become intermittently aligned with other radial and annular lubricant passages to allow the lubricant to flow from the inner edge of the outer casing to the lubricant reservoir at the center of rotation due to the meshing of the gears. Alternatively, a lubricant return passage may be formed by a recessed face on the body of the primary power transmission gear to communicate flow to the remaining annular and radial lubricant return passages.

It is an object of the present invention to provide a lubrication system for a transmission to lubricate the moving surfaces therein.

It is a further object of the invention to provide a means for recirculating the lubricant in such a lubrication system which may be fully contained within the rotary housing of the transmission without decreasing the efficiency of the transmission. Other and more detailed objects of the invention will become apparent upon examination of the drawings and specification contained herein, wherein:

FIG. 7 is a cross-sectional view of a planetary gear transmission showing a third embodiment of the present invention;

Figure 1:
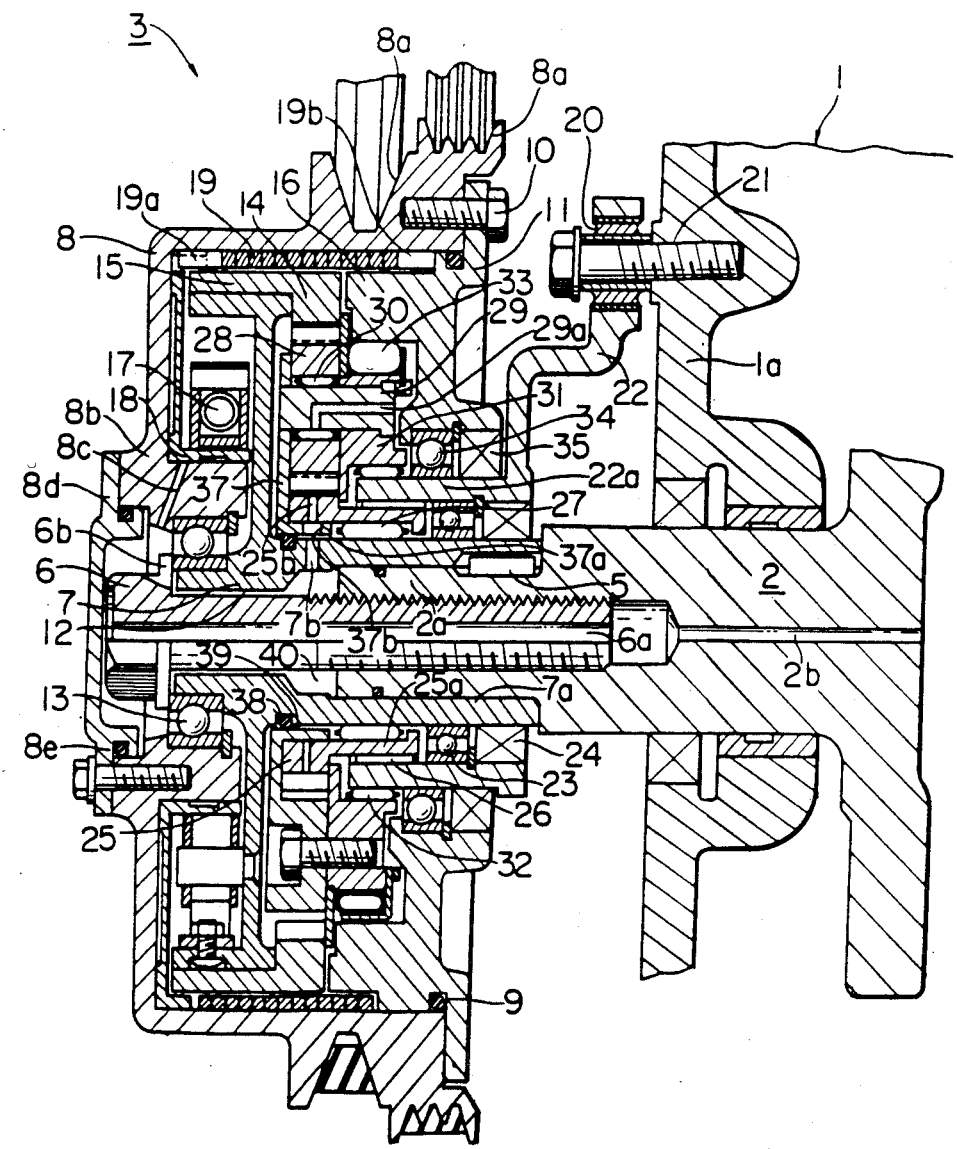
FIG. 1 is a cross sectional view of a planetary gear transmission attached to one end of the engine crankshaft.

Referring to FIG. 1, the transmission 3 has an input flange 7 which is connected to the leading end portion 2a of the crankshaft 2 by a key 5 through corresponding keyways. The crankshaft 2 is integrally joined with a bolt 6 thus forming the transmission input member. The transmission 3 output member is formed by the transmission rotary housing 8 which is integrally formed with the transmission output pully 8a. A rear cover 11 is fitted with an O-ring 9 and fastened to the rotary housing 8 through bolt means 10.

Coaxial air vents 2b and 6a are formed through the center of rotation of the crankshaft 2 and the integrally joined bolt 6, respectively, to allow communication between the inside of the transmission 3 and the crankcase of the engine 1 to release pressure increases within the transmission 3 due to transmission temperature changes. An annular lubricant passage 12 is provided between the inner circumference of the input flange 7 and the outer circumference of the bolt 6 which is adjacent to the flange 7. The annular lubricant passage 12 communicates with the inside of the transmission 3 through a notch 6b formed in the head of the bolt 6. Further lubricant communication is provided through a lubricant passage 8c in the rotary housing boss 8b which is supported through a bearing 13 on the leading end portion of the input flange 7. The lubricant is maintained in the transmission 3 by a housing cap 8d over the head of the bolt 6. The housing cap 8d is hermetically sealed to the housing boss 8b through an O-ring 8e.

A ring gear 14 with internal teeth is press-fitted around the outer circumference of the input flange 7. A centrifugal clutch 17 and a corresponding clutch drum 18 is attached to one side of the input flange 7. The centrifugal clutch 17 operates to effect engagement between the input flange 7 and the clutch drum 18 when the number of input revolutions per minute is lower than a predetermined value and to release that engagement when the number of revolutions per minute exceeds a predetermined value. Lubricant is supplied to the contacting portions between the circumference of the clutch drum 18 and the outer circumference of the rotary housing boss 8b through the lubricant passage 8c.

An input side drum 15 is formed at the outer circumference of the ring gear 14. A corresponding output side drum 16 is formed at the inner face of the rear cover 11. A wrap spring 19 is loosely fitted about the input side drum 15 and the output side drum 16. The wrap spring 19 is made from a spring material which, in the preferred embodiment, has a cross section which is rectangular including square. When fitted in its loose state, a predetermined gap is established between the inner circumference of the wrap spring 19 and the outer circumference of the input side drum 15 and the output side drum 16. Thus formed, the wrap spring 19 has a input end 19a engageable with the outer circumference of the clutch drum 18. The output end 19b of the wrap spring 19 is engageable with the outer circumference of the rear cover 11. When the ends of the wrap spring 19 are correspondingly engaged and revolutions are transmitted from the input end 19a to the output end 19b, the wrap spring 19 is wound so as to integrally connect the clutch drum 18, the input side drum 15, the output side drum 16 and the rotary housing 8. This provides a direct connection between the engine crankshaft 2 and the transmission output pully 8a.

A stationary arm 22 with a hollow shaft 22a is fixedly fastened to the engine cylinder block 1a through an elastic member 20 by bolt means 21. The stationary arm 22 is supported by a journal 7a on the input flange 7 through a bearing 23 with an oil seal 24. A bearing 27 is sandwiched between the boss 25a and the journal 7a. A sun gear 25 with a boss portion 25a is fixedly splined 26 to the inner circumference of the hollow shaft 22a.

Three pinion gears 28 are arranged in meshing engagement between the ring gear 14 and the sun gear 25. The pinion gears 28 are rotatably supported by a carrier 31 through shafts 29 and bearings 30. Each pinion shaft 29 is formed with an axial and radial lubricant passage 29a through which lubricant is fed to the corresponding pinion bearing 30. An additional bearing 32 is sandwiched between the pinion carrier 31 and the outer circumference of the hollow shaft 22a.

A one-way clutch 33 is interposed between the pinion carrier 31 and the rear cover 11. The one-way clutch 33 operates to selectively engage the carrier 31 and the rear cover 11, thereby transmitting the rotational motion of the carrier 31 to the rotary housing 8 when the transmission 3 is in its speed changing transmission operation. When the transmission 3 is in its directly coupled mode, the one-way clutch 33 rotates idly due to the differing speeds of the rear cover 11 and the carrier 31. The rear cover 11 is rotatably supported by a bearing 34 to the outer circumference of the hollow shaft 22a of the stationary arm 22. An oil seal 35 maintains the liquid-tight integrity of this connection.

A lubricant feeding device 36 is formed according to the present invention by utilizing the speed change mechanism. Such a speed change mechanism is illustrated herein by a planetary gear mechanism which is composed of a ring gear 14, a sun gear 25, at least one pinion gear 28 and a pinion carrier 31. Lubricant guide walls 31a are formed on the carrier 31 and disposed on the leading side of rotation substantially about the outer circumference of the sun gear 25 and the meshing portions of the pinion gears 28 and the ring gear 14. For example, when the elements are arranged such that at least one pinion gear is vertically aligned with the sun gear, the lubricant guide walls 31a will be on the left side of the pinion gear.

In the preferred embodiment of the guide walls 31a, the side of the wall 31a facing the sun gear 25 and pinion gear 28 is essentially that of a cartioid with the point situated at the meshing portion of the sun gear 25 and a pinion gear 28; one surface extending towards the meshing point of the pinion gear 28 and the ring gear 14, the other surface extending along the trailing side of rotation towards the meshing point of the sun gear 25 and an adjacent pinion gear 28. When the ring gear 14 is revolved in the direction of the arrow in FIG. 2, the pinion gears 28 revolve around the stationary sun gear 25 in the same direction. The meshing of the pinion gears 28 with the ring gear 14 tends to move the lubricant, collected on the ring gear 14 due to the centrifugal force of the inner components of the transmission, in the direction of pinion 28 rotation. The lubricant guide walls 31a act to direct the flow created by the meshing of the pinion gears 28 with the ring gear 14 towards the lubricant return passage.

Figure 2:
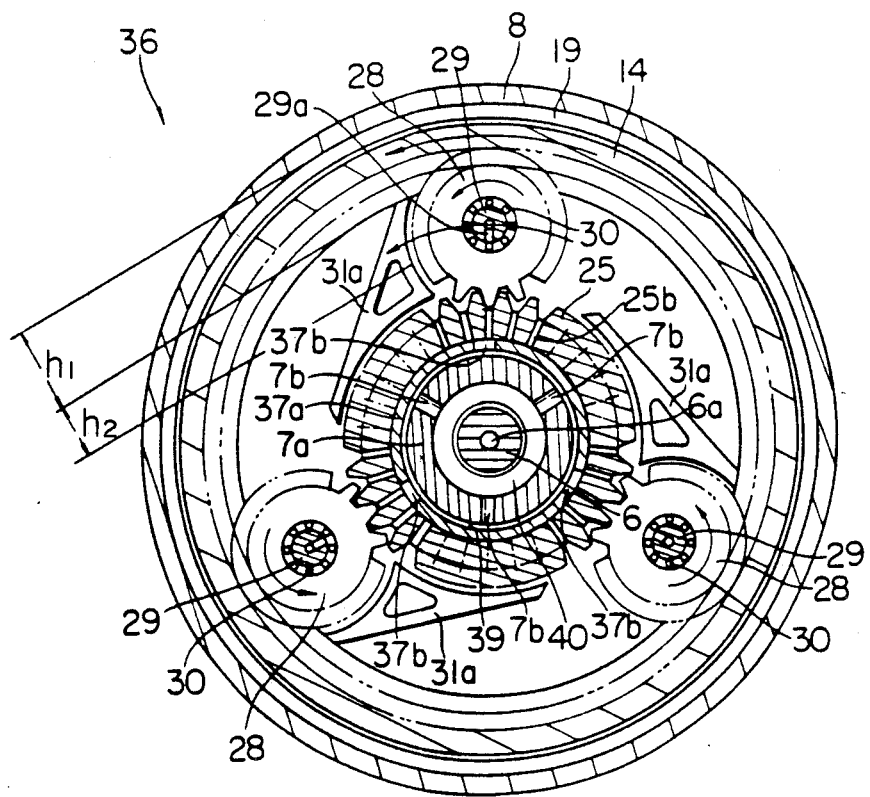
FIG. 2 is a front sectional view of a planetary gear transmission showing a first embodiment of a lubricant recirculation device in conjunction with the planetary gear transmission.

FIGS. 1 and 2 show the first embodiment of the lubricant return passage of the invention. As shown most clearly in FIG. 2, the sun gear 25 is formed with radial lubricant return holes 25b at the roots of the sun gear 25 teeth. A side plate 37 supports the ends of the pinion shafts 29 opposite the carrier 31 and, with the carrier 31, forms an enclosure about the pinion gears 28 and sun gear 25. The side plate 37 has a boss 37a positioned within the sun gear boss 25a and has lubricant return ports 37b formed radially therethrough. The rotation of the carrier 31 and the sideplate 37 brings the sideplate boss lubricant ports 37b into successive alignment with the lubricant holes 25b of the sun gear 25. An annular lubricant passage 39 is formed between the side plate boss 37a and the journal 7a of the input flange 7 which is fitted within the inner circumference of the boss 37a and sealed by means of an O-ring or square ring 38. The annular lubricant passage 39 communicates with radial lubricant holes 7b formed in the journal 7a of the input flange 7. The lubricant holes 7b communicate with a second annular lubricant passage 40 which is defined by the inner circumference of the journal 7a, the leading end face of the crankshaft 2 and the outer circumference of the bolt 6. This second annular lubricant passage 40 communicates with the aforementioned lubricant supply passage 12 which acts as a lubricant reservoir within the transmission 3.

The operation of the first embodiment having the construction thus far described will be explained as follows. The input flange 7 revolves directly on the crankshaft 2 of the engine 1. When the speed of the input flange 7 is below a predetermined value, the centrifugal clutch 17 mounted on the input flange 7 comes into frictional engagement with the clutch drum 18 thus winding the wrap spring 19. As the wrap spring 19 is tightened, the transmission 3 input and output sides are interlocked such that revolutions of the engine crankshaft 2 are transmitted at a ratio of 1:1 to the output pully 8a of the rotary housing 8. In such a configuration the pinion gears 28 revolve around the sun gear 25 on their respective shafts 29 in the same direction as the ring gear 14. The carrier 31 will revolve slower than the other components of the transmission, such as the rear cover 11, which are directly connected to the crankshaft 2. The difference in rotational speed between the carrier 31 and the rear cover 11 is accommodated by the one-way clutch 33 which is interposed between the carrier 31 and the rear cover 11.

When the speed of the engine 1 exceeds a predetermined level, the centrifugal clutch 17 becomes disengaged thereby releasing engagement between the input flange 7 and the clutch drum 18. The wrap spring 19 is released and becomes loose due to its own restoring force, thus uncoupling the input side drum 15 from the output side drum 16. In such a configuration, the ring gear 14 revolves integrally with the crankshaft 2. The carrier 31 revolves at a reduced speed due to the gear reduction ratio within the planetary gear mechanism. This reduced rotational speed is transmitted to the housing 8 and the pully 8a through the one-way clutch 33.

Transmission lubricant is maintained in the vicinity of the center of rotation of the transmission 3. Due to centrifugal force created by rotation of the various components, the lubricant is fed to the inside surface of the outer circumference of the rotary housing 8. More specifically, the lubricant flows from the lubricant passage 40 through the lubricant passage 12 and the notch 6b in the bolt 6 to lubricate the rotary housing bearing 13. From there lubricant flows through the lubricant passage 8c to lubricate the contacting faces between the clutch drum 18 and the rotary housing 8 until it reaches the inner wall of the outer circumference of the rotary housing 8. Lubricant passages also enable lubricant to flow from a reservoir to lubricate the stationary arm 22 bearings 23 and 27 and its oil seal 24. The lubricant then flows through the sun gear spline 26 to lubricate the carrier bearing 32 and the rear cover bearing 34 and oil seal 35. The lubricant can then flow through the lubricant passage 29a to lubricate the pinion bearings 30 and the one-way clutch 33 until its reaches the inner wall of the outer circumference of the rotary housing 8.

Rotation of the pinion gears 28 within the ring gear 14, which, with a planetary gear mechanism as shown for illustration herein, is situated at the inner wall of the outer circumference of the rotary housing 8, acts to create a flow of the collected lubricant towards the guide walls 31a of the carrier 31. This lubricant is then guided towards the meshing portion between the pinion gears 28 and sun gear 25 from which the lubricant flows to lubricant return passages.

In the first embodiment described herein, the lubricant return passage consists of lubricant holes 25b radially formed in the roots of the teeth of the sun gear 25. If, in the case of a planetary gear mechanism as shown in the present embodiment, the ring gear 14 revolves in the direction of the arrow in FIG. 2, the pinion gears 28 revolve around the immovable sun gear 25 while revolving about their own axis 29 in the same direction. As a result, the lubricant holes 25b of the sun gear 25 move into successive alignment with the lubricant ports 37b of the side plate boss 37a which rotates with the carrier 31. This intermittent alignment of lubricant holes 25b and 37b allows lubricant to flow from the annular lubricant passage 39 and back towards the transmission center of rotation.

A portion of the lubricant introduced to the annular lubricant passage 39 will lubricate the sun gear bearing 27 and seal means 38. The remaining lubricant flows to the second annular lubricant passage 40 through the lubricant holes 7b of the input flange 7 where it re-enters the original lubricant passage 12 and is returned to the inner wall of the outer circumference of the housing 8 as described hereinabove.

Figure 3:
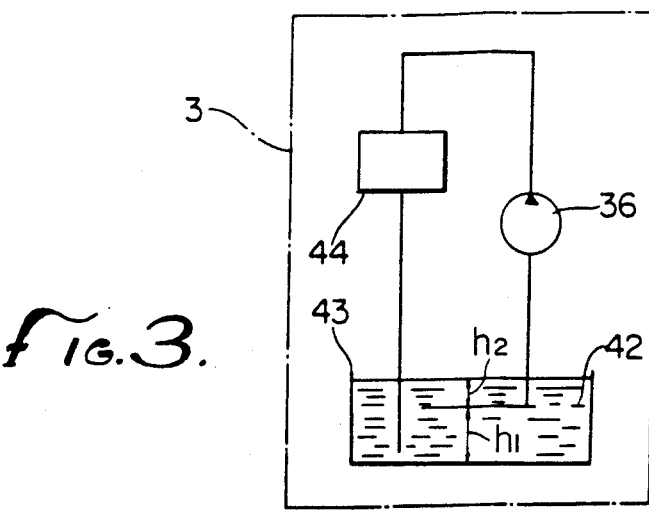
FIG. 3 is a schematic diagram of the hydraulic circuit of the first embodiment as disclosed in FIGS. 1 and 2.

FIG. 3 is a schematic diagram of the hydraulic circuit of the first embodiment as shown in FIGS. 1 and 2. The rotary housing 8 acts as a secondary lubricant reservoir 43 by reserving a predetermined amount of lubricant 42 on the inner wall of its outer circumference. A portion of this reserve lubricant h2 is fed, against the centrifugal force of the transmission, back towards the center of rotation by the lubricant recirculation device 36. This circulation of the lubricant within the rotary housing 8 maintains uniform lubrication of the transmission rolling and sliding portions 44, such as gears, clutches, bearings and the wrap spring.

Figure 4:
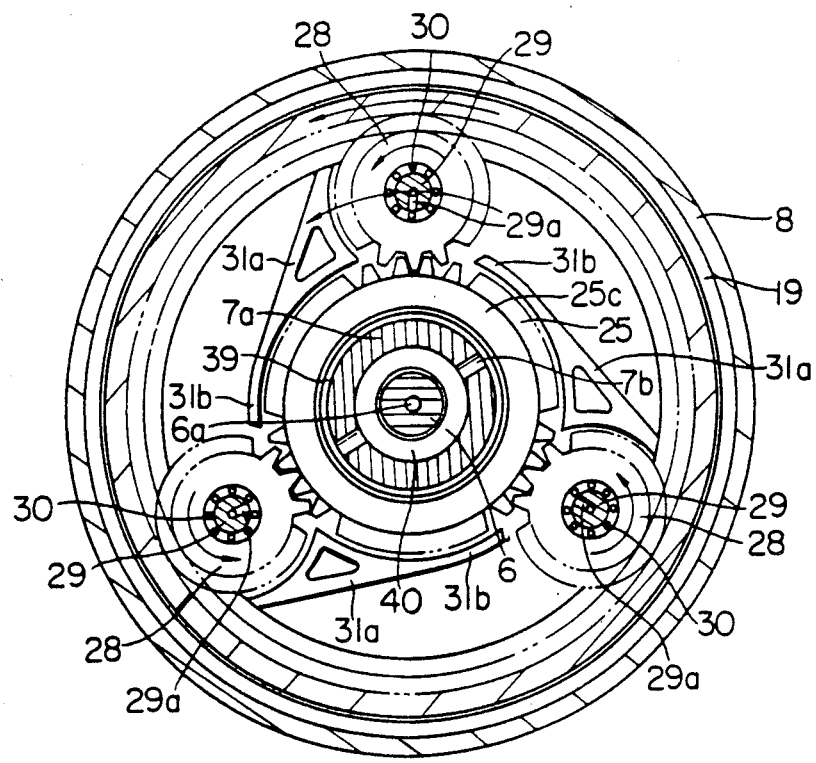
FIG. 4 is a front sectional view of a planetary gear transmission showing a second embodiment of the lubricant recirculation device used in connection with a planetary gear transmission.
Figure 5:
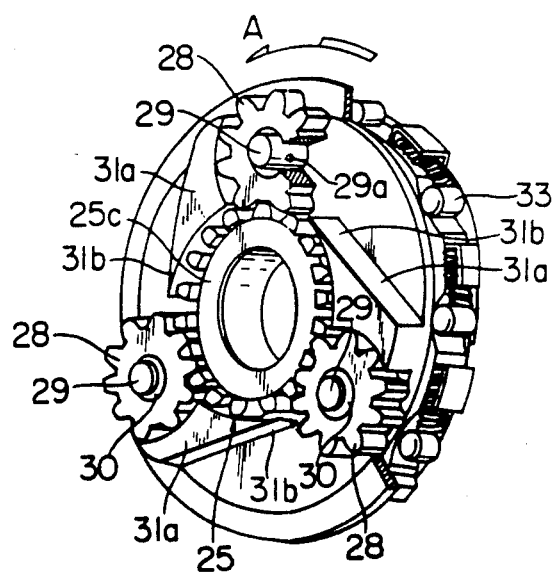
FIG. 5 is a perspective view of the second embodiment of the invention.

FIGS. 4 and 5 show a second embodiment of the present invention. In the second embodiment, the end face of the body of the sun gear 25 is recessed so as to provide communication between the ends of the respective roots of the sun gear teeth which overhang the recessed face of the body of the sun gear 25 and the annular lubricant passage 39 of the first embodiment. The lubricant guide walls 31a of the carrier 31 are constructed to have their leading end portions 31b extending so as to substantially encircle the portions of the sun gear 25 which are not meshing with the pinion gear 28 as shown in FIG. 4. The extended lubricant guide walls 31a prevent the lubricant discharged by the meshing of the sun gear 25 with the pinion gears 28 from being splashed to the outside of the sun gear 25 due to centrifugal force. The second embodiment provides an inexpensive lubricant feeding device since production of a recessed face on the body of the sun gear 25 is easily accomplished.

Figure 8:
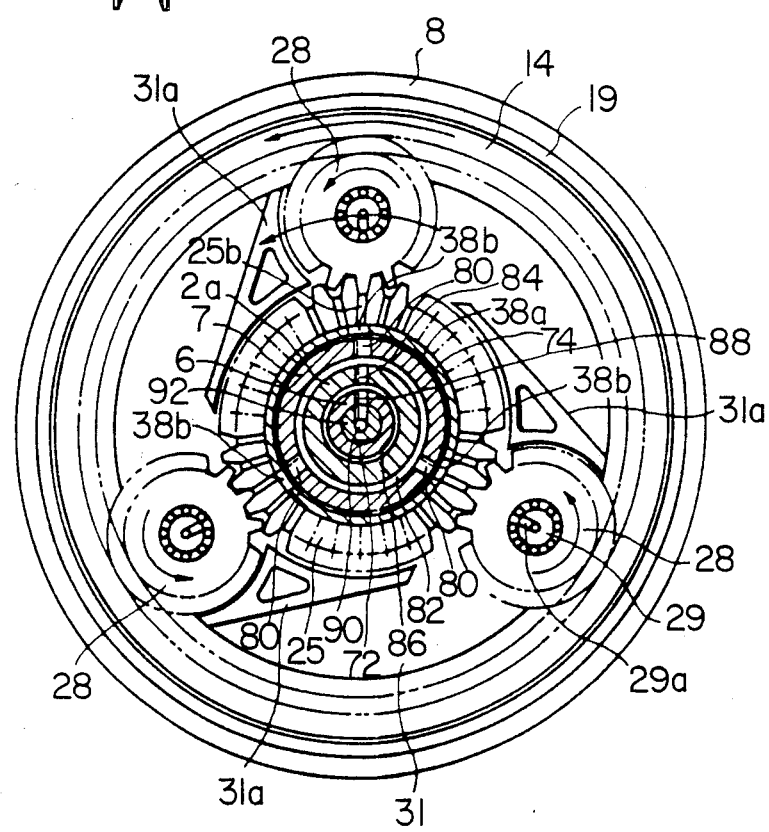
FIG. 8 is a front sectional view of a planetary gear transmission showing the third embodiment of the present invention.
Figure 9:
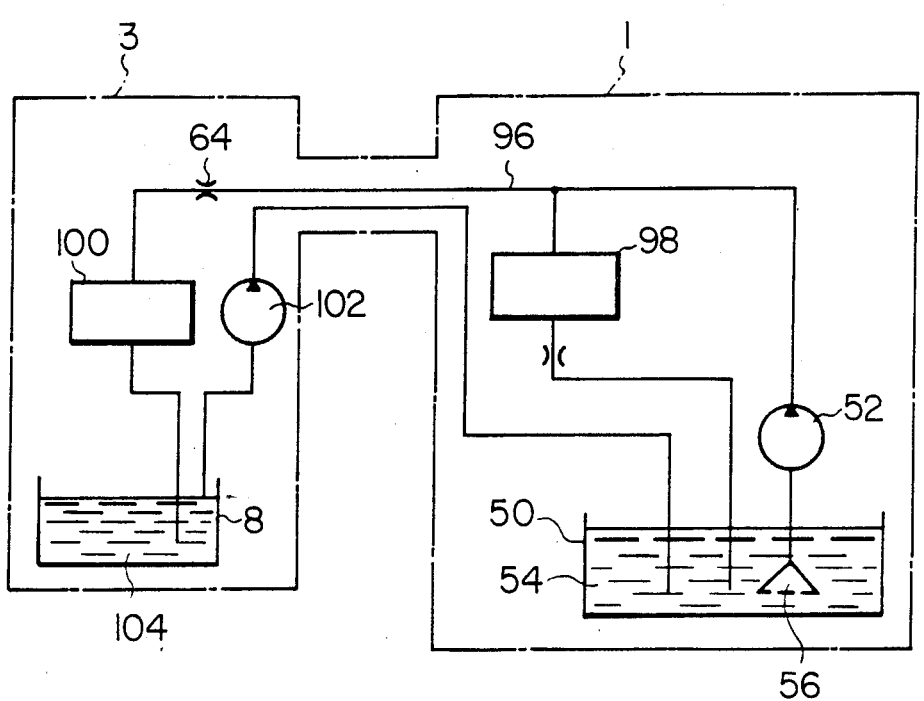
FIG. 9 is a schematic diagram of the hydraulic circuit of the third embodiment of the present invention as disclosed in FIGS. 7 and 8.

A third embodiment of the invention is illustrated in FIGS. 7-9. As shown in the figures, the lubricant system has a lubricant reservoir 50 in the engine 1. A lubricant circulating means 52 draws the lubricant 54 from the lubricant reservoir 50 through filtering means 56 to the transmission lubricant inlet passage 58. The lubricant thus circulated flows through a gap between the lubricant bore 60 and the lubricant conduit 62 of the bolt 6. The lubricant pressure is reduced by a throttle 64 disposed in the lubricant passage.

Due to the centrifugal force of the transmission components, the lubricant flows to the inner wall of the outer housing 8 as described within. After passing through the throttle 64 the lubricant flows through a first lubricant hole 66 in the bolt 6 to an annular groove 67 between the bolt 6 and the crankshaft 2. The lubricant then flows through a second lubricant hole 68 in the crankshaft 2 and a second annular groove 69 between the crankshaft 2 and the input flange 7 to a third lubricant hole 70 in the input flange 7 to lubricate the stationary arm 22 bearing 23 and seal means 24 and 78. Lubricant then flows through the sun gear 25 spline 26 and the remaining transmission components as described in the first embodiment until it reaches the inner surface of the outer wall of the rotary housing 8. After flowing through the throttle 64 the remaining lubricant in the lubricant conduit 62 flows through a notch 72 and a bore 73 in the head of the bolt 6 to lubricate the rotary housing boss bearing 13 and then to the inner surface of the outer wall of the rotary housing 8 as described in the first embodiment.

Similar to the first embodiment, the lubricant which is gathered on the inner wall of the outer circumference of the rotary housing 8 due to the centrifugal force of the transmission 3 is guided by the meshing of the pinion gears 28 with the ring gear 14 and the sun gear 25 to the lubricant return passages, for example, radial lubricant holes 25b formed in the roots of the teeth of the sun gear 25. If, as in case of the preferred embodiment, a planetary gear mechanism is used, the ring gear revolves in the direction of the arrow, as viewed in FIG. 8, the pinion gears 28 will revolve around the immovable sun gear 25 in the same direction. As before, the intermittent alignment between the meshing portions of the pinion gears 28 and the sun gear 25 create a flow of lubricant through the radial lubricant passages 25b in the sun gear 25 and through the lubricant ports 38b of the boss 38a of the side plate 38, which is fitted in the bore of the sun gear 25. This lubricant is subsequently introduced into an annular passage 74 which lubricates the sun gear bearing 27 and its corresponding oil seals 76 and 78. The lubricant is returned to the lubricant reservoir 50 by the discharging force of the lubricant feeding device 37 by flowing from the annular passage 74 through a first lubricant hole 80 to a first annular groove 82 through a second lubricant hole 84. From the second lubricant hole 84 the lubricant flows through a second annular groove 86 to a third lubricant hole 88 wherein a lubricant passage 90 in the lubricant plug 92 returns the lubricant to the lubricant return conduit 62. The lubricant return conduit 62 communicates with the lubrication reservoir 50 to complete the circulation of the lubricant through the transmission 3.

FIG. 9 is a schematic diagram of the third embodiment of the invention as shown in FIGS. 7 and 8 showing the hydraulic circuit of the third embodiment. Lubricant circulation means 52, such as a pump, draws lubricant 54 through the lubricant filter 56 and the feeding lines 96. Part of the lubricant goes to the engine sliding portions 98. The remaining lubricant passes through the transmission lubricant throttle 64 to the transmission sliding portions 100. The throttle 64 may be adjusted so that the lubricant discharge rate of the lubricant feeding device 37, which increases with a rise in engine speed, may exceed the flow rate of the lubricant introduced into the transmission 3, which also increases with a rise in engine speed. The inner walls of the rotary transmission housing 8 act as a secondary reservoir 104 to store lubricant. As a result of throttle 64 adjustment, the level H1 of lubricant on the housing 8 wall be maintained at a constant level. Other details of the recirculation of lubricant in the third embodiment are the same as those described in connection with earlier embodiments of the invention.

Figure 6:
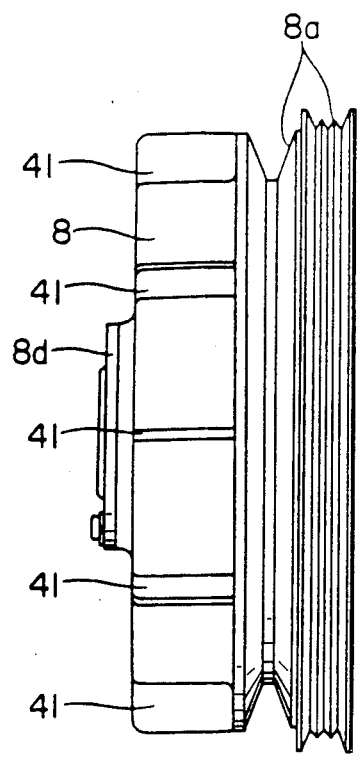
FIG. 6 is a side elevation showing a second embodiment of the transmission rotary housing.

A modification of the rotary housing 8 is additionally possible. By providing fins 106 about its outer circumference, as shown in FIG. 6, the lubricant which is collected on the inner wall of the outer circumference of the housing 8 may be air-cooled. The fins 106 act to further reduce the heat generated by the transmission 3 and further improve its durability.

The description thus far made in connection with the foregoing respective embodiments of the invention are directed to examples in which the lubricant feeding device makes use of a planetary gear mechanism. However, the present invention should not be limited to those embodiments, since a lubricant pump may be disposed within the rotary housing to act as the aforementioned lubricant feeding device when a planetary gear mechanism is not utilized. In addition, although the foregoing embodiments are shown in connection with a transmission for driving auxiliary equipment, the present invention may also be applied to a transmission other than that for such auxiliary mechanisms.

Although preferred embodiments of the present invention have been described herein above, it is anticipated that these embodiments are to be used merely for the purpose of example and should not be construed to limit the scope of the appended claims.

We claim:

1. A lubrication system for a planetary gear speed change mechanism having a center of rotation for aligning with an engine crankshaft and a bolt with a head for connecting to the engine crankshaft, a rotary housing with a boss portion having an inner surface and bearing and seal means, an output member including the rotary housing and having a centrifugal clutch, a clutch drum, a wrap spring, a stationary arm with a hollow shaft having bearing and seal means, an output drum, a sun gear having external teeth and a body splined to the stationary arm with bearing and seal means, a ring gear with internal teeth fitted within the rotary housing, a plurality of pinion gears with support shafts and bearing means on a pinion carrier, said pinion gears meshing between the sun gear and the ring gear, a rear cover having bearing and seal means, a one-way clutch, a lubricant reservoir at the speed change mechanism center of rotation, an input flange with bearing and seal means, and a slide plate with a boss portion fitted within the sun gear, comprising, an annular passage providing communication between the lubricant reservoir and the head of the bolt, a notch formed in the head of the bolt providing communication between said annular passage and the rotary housing bearing, a second lubricant passage formed through the rotary housing boss providing communication between said notch and the clutch drum, passageway means providing communication between said second lubricant passage and the inner surface of the rotary housing, passageway means providing communication from the reservoir to the stationary arm bearings and lubricant seal means, passageway means along the sun gear spline providing communication from the stationary arm bearings and lubricant seal means to the pinion carrier bearing and the rear cover bearing and lubricant seal means, a lubricant passage formed through the pinion gear support shafts providing communication from the rear cover bearing and lubricant seal means to the pinion bearings and then to the one-way clutch and the inner wall of the rotary housing, lubricant guide walls formed on the pinion carrier, said guide walls being disposed substantially about the sun gear and each pinion gear, and lubricant return passages including lubricant ports in the side plate boss, an annular lubricant passage between the input member and the sun gear lubricating the sun gear bearing and seal means, a lubricant passage formed through said input member providing communication between said annular passage and the lubricant reservoir.

2. A lubrication system as set forth in claim 1 wherein said lubricant return passages further include lubricant holes radially formed through roots of the teeth of the sun gear providing communication between said lubricant guide walls and another of said lubricant return passages.

3. A lubrication system as set forth in claim 1 wherein said lubricant return passages further include a recessed face on the body of the sun gear providing communication between said lubricant guide walls and another of said lubricant return passages.

4. A lubrication system for a planetary gear speed change mechanism including a lubricant reservoir and a center of rotation, a rotary housing, an input member including an input flange and a bolt connecting the input flange to a crankshaft having a center line, a stationary arm with a hollow shaft and having bearing and seal means, a sun gear splined to the stationary arm and having external teeth and bearing and seal means, a ring gear fitted within the rotary housing, a pinion carrier with a supporting bearing and seal means, a plurality of pinion gears with support shafts and bearing means mounted on said pinion carrier, said pinion gears meshing between the sun gear and the ring gear, a rotary housing boss with bearing and seal means, a rear cover with bearing and seal means a centrifugal clutch including an input side drum, an output side drum, and a wrap spring, comprising, a lubricant inlet passage providing communication between the lubricant reservoir and the speed change mechanism center of rotation, a lubricant conduit along the center line of the crankshaft and bolt, a throttle valve disposed between said lubricant inlet passage and said lubricant conduit, a first lubricant hole formed radially through the bolt, a first annular groove between the bolt and the crankshaft, a second lubricant hole radially through the crankshaft, a second annular groove communicating between said second lubricant hole and the input flange, a third lubricant hole formed radially through the input flange communicating between said second annular passage and the stationary arm bearing and seal means and sun gear spline, passageway means providing communication to the pinion carrier bearing and seal means and rear cover bearing and seal means, a notch and a lubricant passage formed through the head of the bolt, a second passage through the rotary housing boss providing communication between said notch and at least one of said clutch drums, passageway means providing communication between said second lubricant passage and the inner surface of the rotary housing, a lubricant passage formed through the pinion gear support shafts providing communication from the rear cover bearing and lubricant seals means to the pinion bearings and then to the one-way clutch and the inner wall of the rotary housing, lubricant guide walls formed on the pinion carrier, said guide walls being disposed substantially about the sun gear and each pinion gear, and lubricant return passages including lubricant ports in the side plate boss, an annular lubricant passage between the input member and the sun gear boss lubricating the sun gear bearing and seal means, and a lubricant passage formed through said input member providing communication between said annular passage and the lubricant reservoir.

5. A lubrication system as set forth in claim 4 wherein said lubricant return passages further include lubricant holes radially formed through roots of the teeth of the sun gear providing communication between said lubricant guide walls and another of said lubricant return passages.

6. A lubrication system as set forth in claim 4 wherein said lubricant return passage further includes a recessed face on the body of the sun gear providing communication between said lubricant guide walls and another of said lubricant return passages.

* * * * *

UNITED STATES PATENT AND TRADEMARK OFFICE
CERTIFICATE OF CORRECTION

PATENT NO. : 4,573,373
DATED : March 4, 1986
INVENTOR(S) : Yasuo Shimizu and Masami Ogura It is certified that error appears in the above-identified patent and that said Letters Patent are hereby corrected as shown below:

Column 1, line 12 correct the spelling of "speed".

Column 1, line 16 change "Oqura" to --Ogura--.

Column 1, line 33 change "comtemplates" to --contemplates--.

Signed and Sealed this

Nineteenth Day of August 1986

[SEAL]

Attest:

DONALD J. QUIGG

Attesting Officer

Commissioner of Patents and Trademarks